(12) United States Patent
Morgan

(10) Patent No.: US 6,438,951 B2
(45) Date of Patent: Aug. 27, 2002

(54) HYDRAULIC DRIVE WITH REGENERATION CIRCUIT

(76) Inventor: George H. Morgan, 401 Tyler Ave., Evansville, IN (US) 47715-3243

(*) Notice: Subject to any disclaimer, the term of this patent is extended or adjusted under 35 U.S.C. 154(b) by 0 days.

(21) Appl. No.: 09/852,134

(22) Filed: May 9, 2001

Related U.S. Application Data

(60) Provisional application No. 60/707,922, filed on May 30, 2000.

(51) Int. Cl.[7] .................................. F16D 31/02
(52) U.S. Cl. .................................. 60/419; 60/494
(58) Field of Search ........................ 60/459, 462, 464, 60/465, 468, 487, 489, 494, 419; 417/228, 348

(56) References Cited

U.S. PATENT DOCUMENTS

| | | | | |
|---|---|---|---|---|
| 3,962,954 A | * | 6/1976 | Jacob et al. | 417/300 X |
| 4,102,425 A | * | 7/1978 | Marsden et al. | 60/468 X |
| 4,295,539 A | * | 10/1981 | Beck et al. | 60/489 X |
| 4,768,340 A | * | 9/1988 | Hamilton | 60/489 X |
| 5,293,745 A | * | 3/1994 | Roche | 60/419 |
| 5,319,932 A | * | 6/1994 | Roche | 60/468 X |
| 6,145,287 A | * | 11/2000 | Rosskopf | 60/489 X |
| 6,279,317 B1 | * | 8/2001 | Morgan | 60/464 X |
| 6,349,543 B1 | * | 2/2002 | Lisniansky | 60/465 X |

OTHER PUBLICATIONS

ASAE Paper #911596 "Gerotor Flow Divider" By Applicant (Figs. 15 & 16 Most Relevant).
"Fluid Power Circuit Explained" Cover Page Plus Pages FDI, FD2, & FD19–25. (Copied with Author's Permission).

* cited by examiner

*Primary Examiner*—John E. Ryznic
(74) *Attorney, Agent, or Firm*—Gary K. Price; Theresa F. Camoriano; Mark A. Manley, P.E.

(57) ABSTRACT

A hydraulic drive with regeneration circuit comprises a pump, a hydraulic actuator and a rotary flow divider which operates in conjunction with valve means to provide regeneration flow for the hydraulic drive.

8 Claims, 4 Drawing Sheets

HYDRAULIC DRIVE WITH REGENERATION CIRCUIT

CROSS REFERENCES TO RELATED APPLICATIONS:

Provisional Application for Patent No. 60/137,844 of Jun. 7, 1999, with the title "Hydrostatic Drive With Regeneration Ciruit".

Formal Application for patent application Ser. No. 09/572,769 of May 24, 2000 with the title "Hydrostatic Drive with Regeneration Circuit".

Provisional Application for patent No. 60/207,922 of May 30, 2000 with the same title, "Hydraulic Drive With Regeneration Circuit: which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a hydraulic regeneration circuit using a rotary flow divider.

2. Background Information

Hydraulic systems are popular in applications involving hazardous, dirty, and nasty environments, such as coal mines, quarries, food processing plants, and construction sites. Much effort has been expended in trying to increase the efficiency and performance ranges of hydraulic drives.

Open loop hydraulic circuits are very common in industrial applications as they are often less expensive than circuits known, in the trade, as closed loop systems which comprise a fixed or variable displacement pump supplied with fluid by means of a charge pump.

Regeneration circuits are common to the trade on industrial equipment such as hydraulic presses. Some regeneration circuits using rotary dividers are in the public domain for industrial equipment such as hydraulic presses. A publication illustrating gerotor rotary flow dividers in regeneration circuits is the American Society of Agricultural Engineers Paper No. 911596 "Gerotor Rotary Flow Divider" by George Morgan, P.E., Sales Manager, White Hydraulics, Inc. presented at the 1991 International Winter Meeting sponsored by the American Society of Agricultural Engineers at the Hyatt Regency Chicago, Chicago, Ill., December, 1991 which is hereby incorporated by reference. The American Society of Agricultural Engineers is located at 2950 Niles Road, St. Joseph, Mich., 49085-9659, USA, Ph. (616) 429-0300, Fax: (616) 429-3852.

Hydra-Pneu Consulting, Inc., 726 Outer Gray Drive, Newburgh, Ind. 47630-1517, Ph. (812) 853-3234, conducted a course in "Advanced Fluid Power" in 1991, where the instructor, Bud Trinkel, discussed the use of a rotary flow divider in an open loop press circuit. One of his previous students had developed it, and brought it to his class. Applicant then introduced it to his employer at the time, White Hydraulics, Hopkinsville, Ky. The engineers doubted it would work. It did.

The state of the art uses flow dividers in regeneration circuits for open loop, fixed displacement circuits, where the flow divider is in constant operation. This contributes to system wear and noise.

As will be seen from the subsequent description, the preferred embodiments of the present invention broadens the performance range of an open loop hydraulic drive and overcomes exisitng limitations of open loop hydraulic drives.

SUMMARY OF THE INVENTION

The present invention is an improvement to an open loop hydraulic drive which broadens the performance range of said hydraulic drive with a given prime mover, hydraulic pump, and hydraulic drive combination. Said improvement comprises a rotary flow divider in conjunction with a valve means to isolate said flow divider from the open loop hydraulic drive. In the preferred embodiment of the present invention, a three way, two position, solenoid operated, spring return valve receives exhaust hydraulic flow from at least one hydraulic actuator such as, but not restricted to, a motor, a cylinder, or a rotary actuator. In normal, or low speed operation, the rotary flow divider is isolated from the hydraulic pump. For a high speed, or regeneration, cycle, the solenoid valve is actuated, and the exhaust hydraulic flow from the at least one hydraulic actuator outlet is diverted to a rotary flow divider. In the preferred embodiment of the present invention, for a 10 gallon per minute displacement pump in an open hydraulic drive, it would be a two section White ROLLERSTATOR (Reg. U.S. Trademark) gerotor flow divider. Fluid flow from a first section of the rotary flow divider sections is returned to a reservoir, while the fluid flow from a second section of the rotary flow divider is combined with fluid flow from the pump into the at least one hydraulic actuator. The effect of this arrangement is, for a rotary flow divider with sections of equal fluid displacement per revolution, that the fluid flow into the at least one hydraulic actuator becomes approximately double the output fluid flow of the hydraulic pump.

DESCRIPTION OF THE PREFERRED EMBODIMENTS

Figure 1:
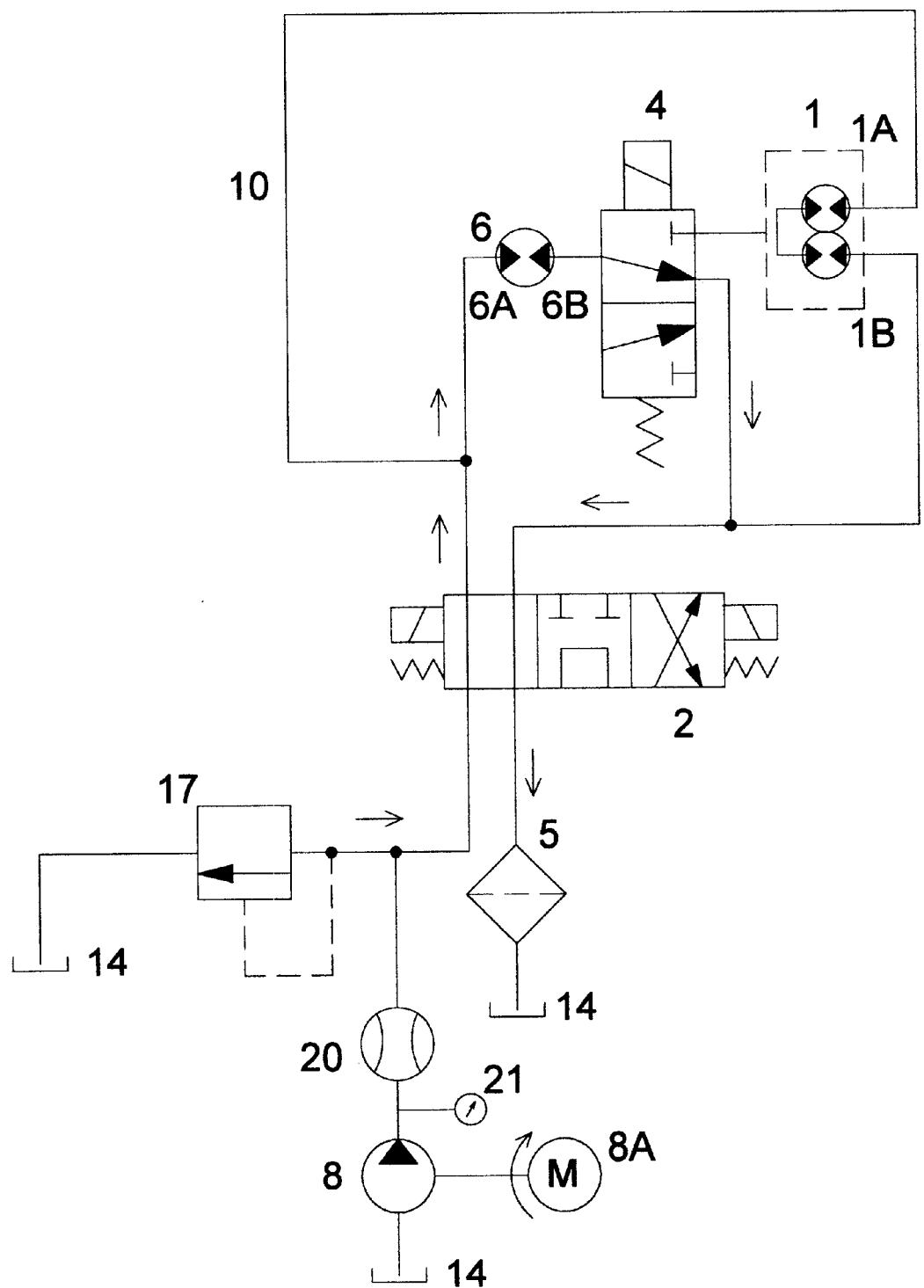
FIG. 1 illustrates the preferred embodiment of the present invention, a hydraulic drive with regeneration circuit, prior to actuation of a valve means.

FIGS. 1 through 4 illustrate the preferred embodiment of the present invention, a hydraulic drive with regeneration circuit 10 comprising a rotary flow divider 1 comprising a first section 1A and a second section 1B, a directional valve 2, a hydraulic pump 8; at least one hydraulic actuator 6 such as, but not restricted to, a motor, a linear actuator, or a rotary actuator, said at least one hydraulic actuator 6 comprising an inlet 6A and an outlet 6B; and a first valve means 4.

The hydraulic drive with regeneration circuit 10 is an open loop circuit which means fluid flow from said pump 8 is returned to a reservoir 14 as opposed to being returned directly to said pump 8 as would be the case in a closed loop hydrostatic drive.

Also shown in FIGS. 1 through 4 are auxiliary items common to hydraulic circuits, such as, but not restricted to, a motor 8A such as, but not restricted to an electric motor, an air motor, or an engine; a reservoir 14; a pressure gauge 21; a flow meter 20; a relief valve 17; a filter 5; and a directional valve 2. While multiple reservoirs 14 are shown, this is an illustration convenience for a single reservoir 14, which would be the most common circumstance for said circuit 10. Typically there is only one reservoir 14, but in a fluid power schematic it is a common practice to show multiple reservoirs to simplify the schematic.

Figure 4:
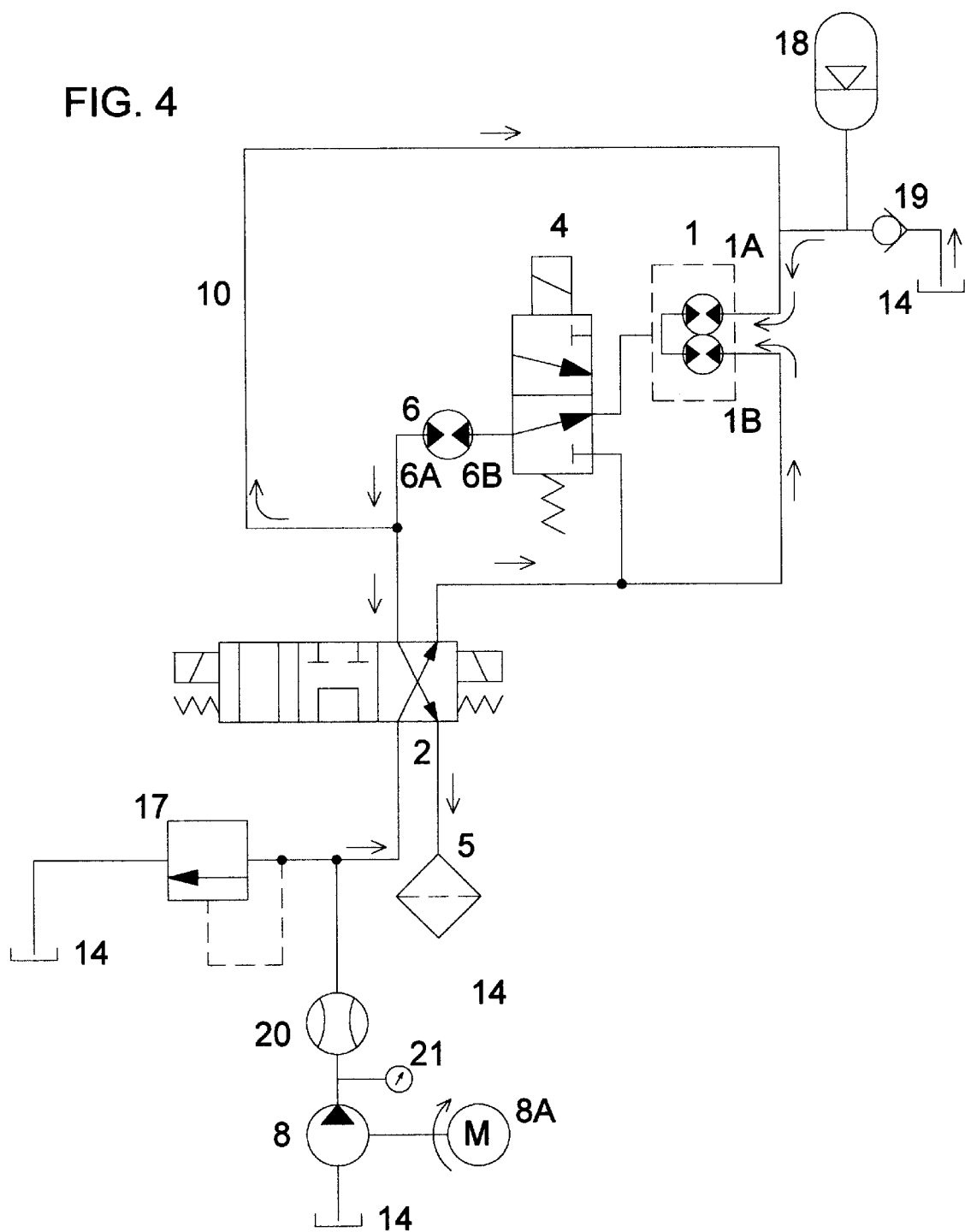
FIG. 4 illustrates the preferred embodiment of the present invention in the reverse flow mode after actuation of the valve means which activates a regeneration flow.

FIG. 4 also illustrates an anti-cavity check valve 19 and an accumulator 18, both of which are optional features which might be required for some applications.

In the preferred embodiment of the present invention, the first valve means 4 is a solenoid operated spring return two position three way valve.

The first valve means 4 is in fluid communication with the outlet 6B of the at least one hydraulic actuator 6.

Figure 3:
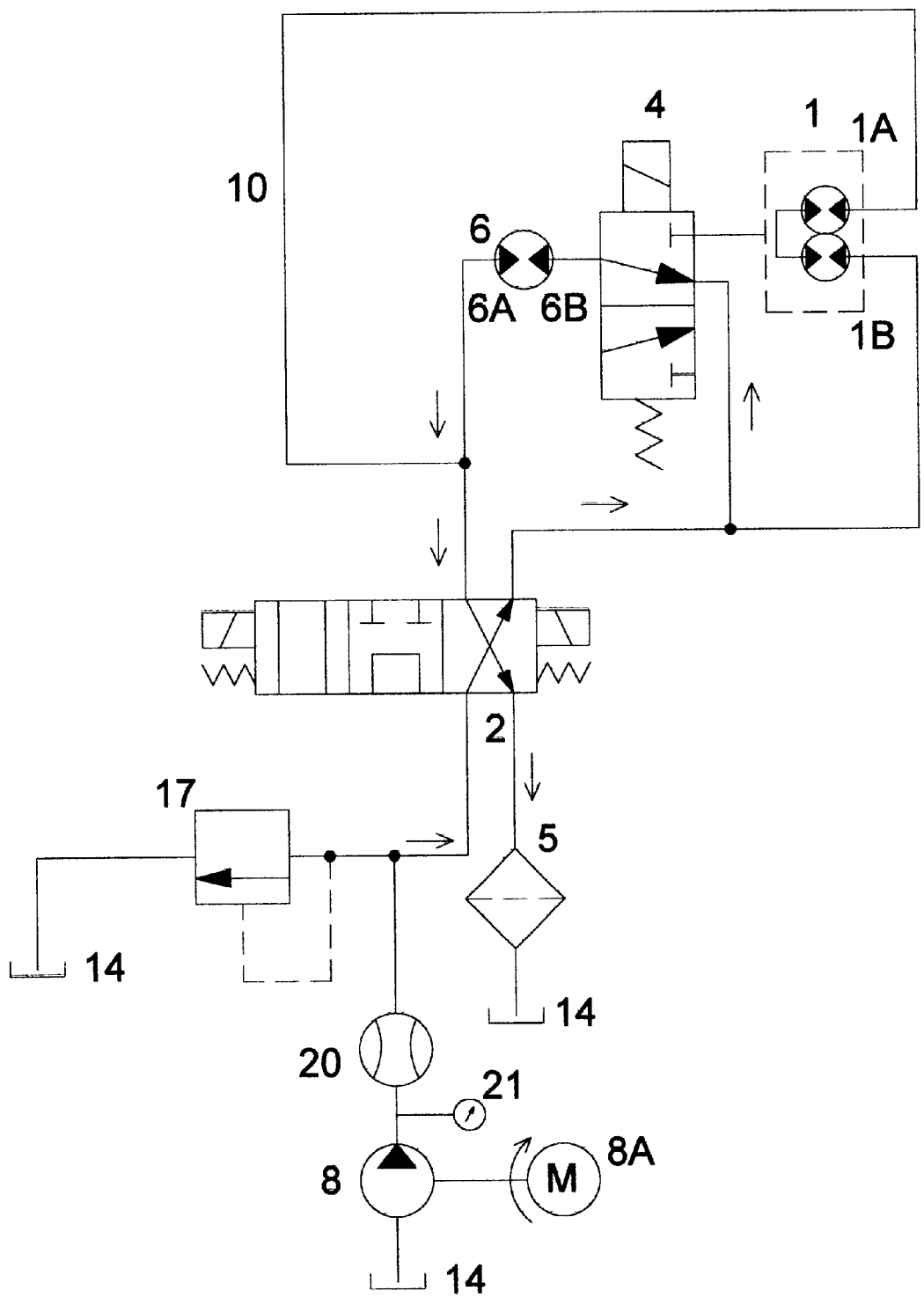
FIG. 3 illustrates the preferred embodiment of the present invention in a reverse flow mode prior to actuation of the valve means.

In the non-regeneration mode illustrated in each of FIG. 1 and FIG. 3, the first valve means 4 is in a non-actuated state isolating said flow divider 1 from said pump 8 flow in the circuit 10. Fluid flow from the hydraulic pump bypasses said flow divider 1. While some leakage is expected internally within said flow divider 1, this is not seen as a problem with rotary flow dividers manufactured as the White ROLLER STATOR (TM) flow dividers which are manufactured by White Hydraulics, Inc. of Hopkinsville, Ky., a major supplier of gerotor hydraulic motors and flow dividers often referred to as gerotor flow dividers.

In the preferred embodiment of the present invention, said flow divider 1 is a rotary flow divider with orbiting gerotor elements which are known to the trade and available from the aforementioned White Hydraulics, Inc.

In FIG. 1 the directional valve 2 directs fluid flow as shown by directional arrows into the inlet port 6A of the at least one hydraulic actuator 6 so the fluid flows through the at least one hydraulic actuator 6 and out the outlet port 6B through the first valve means 4, which is in the non-actuated state, and out to the reservoir 14. The direction of fluid flow into the at least one hydraulic actuator 6 shown in FIG. 1 is arbitrarily selected as a forward direction.

Figure 2:
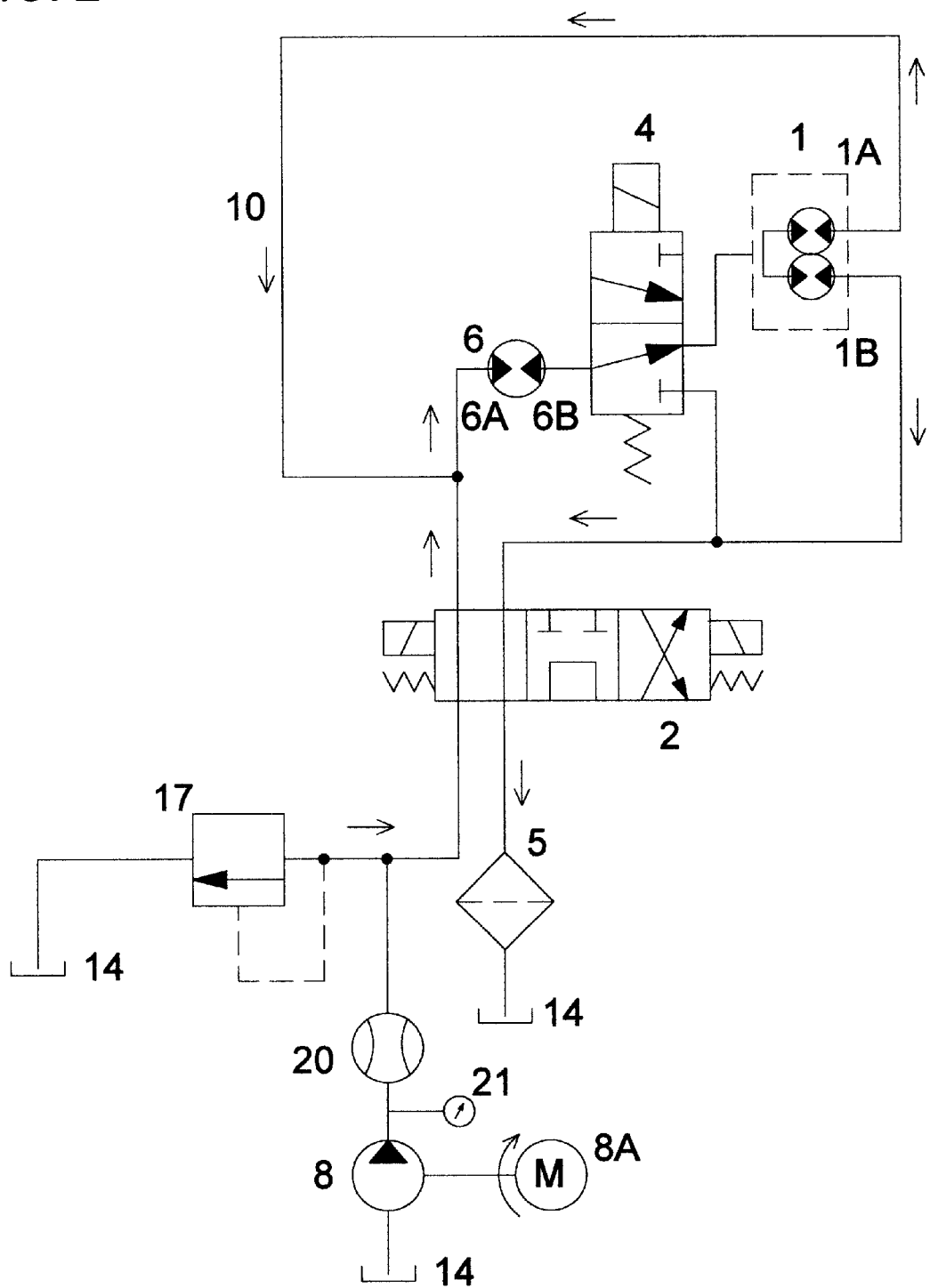
FIG. 2 illustrates the operation of the preferred embodiment of the present invention when said valve means is actuated which activates a regeneration flow.

In FIG. 2, the first valve means 4 is actuated which results in a regeneration mode in the forward direction as illustrated. The fluid flow from the at least one hydraulic actuator 6 is routed through the first valve means 4 into said flow divider 1.

Fluid flow from the first section 1B of said flow divider 1 is routed through the directional valve 2 back into the reservoir 14.

Fluid flow from the second section 1A of said flow divider 1 is routed into the fluid flow from the pump 8 into the at least one hydraulic actuator 6. The fluid flow from the second section 1B combines with the fluid flow from the pump 8. For said flow divider 1 with two equal sections 1A and 1B, the fluid flow into the at least one hydraulic actuator 6 will stabilize at twice the pump 8 flow with approximately half of the pressure of the fluid flow into said actuator 6 dropping across said actuator 6. At said flow divider 1, the pressure of the fluid flow into the first section 1A, which is approximately half of the pressure of the fluid flow into said actuator 6 will drop to exhaust pressure across said rotary flow divider 1, because the first section 1B is acting, as a motor, powering the second section 1A which will boost the pressure from said actuator 6 from what was half of the pressure into said actuator 6 back up to whatever pressure required for the fluid flow from the second section 1A to be routed into the fluid flow from the pump 8 into the at least one hydraulic actuator 6.

Rotary flow dividers have a characteristic referred to as "intensification". If there is resistance to flow out of one section of a rotary flow divider, pressure of flow from that section can be intensified to a level higher than the pressure of the fluid being supplied to that flow divider by the force applied by inlet pressure on another section of that flow divider if flow from that other section is encountering a much lower pressure.

In FIG. 3, the directional valve 2 has been shifted so the direction of fluid flow through said actuator 6 has been reversed. As the first valve means 4 has not been actuated, said flow divider 1 is still isolated from the circuit 10.

FIG. 4 illustrates fluid flow regeneration when the directional valve 2 has been shifted so the fluid flow through said actuator 6 has been reversed.

In FIG. 4, the pump 8 flow is routed into the first section 1B of said flow divider 1. The first section 1B acts as a motor, driving the second section 1A as a pump. The second section 1A draws fluid from the exhaust flow from said actuator 6. At the instant of the directional valve 2 shifting, flow can be supplied, if required, by the anti-cavitation valve 19 or the accumulator 18.

Fluid drawn into the second section 1A would be forced through the second section 1A and through the first valve means 4 and through the at least one hydraulic actuator 6.

Pressure is a result of resistance to flow. The pump 8 does not pump presure, it pumps fluid which flows. Any load attached to the at least one hydraulic actuator 6 will result in a pressure drop across said actuator 6. The pressure of the fluid flow from pump 8 will rise sufficiently, assuming nothing breaks or the relief valve 17 is not relieving pressure, so the first section 1B has sufficient torque to rotate the second section 1A which is drawing a flow from the reservoir 14 equal to the pump 8 flow and combining with the pump 8 flow to power said actuator 6.

As described above, the circuit 10 permits regenerative flow, or regeneration as it is called in the trade, in both forward and reverse directions as required, with said flow divider 1 isolated, by means of the first valve 4, from the circuit 10 when regeneration is not required. By isolated is meant the rotary actuator 1 is not active.

Requirements for means providing for makeup flow into the second section IA of the rotary flow divider, such as the anti-cavitation valve 19 or the accumulator 18 would depend on application circumstances, such as, but not restricted to, size of components, amount of fluid flow, and distances between components.

When sections 1A and 1B of said flow divider 1 are of equal displacement, fluid flow, in the regeneration mode is theoretically doubled, with half the pressure into said actuator 6 available for work, theoretically. Practically, in accordance with the Second Law of Thermodynamics, which essentially says "The house takes its cut", there are some losses due to internal leakages & pressure drops through various elements of said hydraulic drive with regeneration circuit 10. Energy is not being created or destroyed, by said flow divider 1, merely changed in form.

Variations in the amount of regenerated flow are achievable by varying the ratio of fluid displacements of the sections 1A and 1B of said flow divider 1. Varying the amount of regenerated flow, by varying the ratio of fluid displacement of sections 1A and 1B of said flow divider 1, naturally affects how much pressure into said actuator 6 is available. With less regeneration, by virtue of a smaller section forcing fluid flow into the fluid flow from pump 8 and consequently into said actuator 6, more pressure drop is available for work across said actuator 6, as less pressure is required by said flow divider 1 on the larger section for intensifying pressure from the smaller section of said flow divider 1. Conversely, having a larger section of said flow dividers 1 feeding fluid into the line between said pump 8 and said at least one hydraulic actuator 6, results in less pressure drop available for work across said actuator 6.

Although the description above contains many specificities, these should not be construed as limiting the scope of the invention but as merely providing illustrations of some of the presently preferred embodiments of this invention.

While gear type rotary flow dividers of high capacity with low pressure drop exist, they tend to be considerably more expensive and less efficient across the lower speed ranges than gerotor flow dividers such as are manufactured by White Hydraulics.

The directional valve 2 is shown in FIGS. 1 through 4 as having a center position. Not all directional valves have a center position. Also, the illustration indicates the directional valve 2 has what is called a cylinder spool, i.e. in the centered position it has blocked work ports. There are a number of different types of spools that would serve the purpose, so the intent is not to restrict this description to a valve with a cylinder spool. In some cases a motor spool which would be one with the work ports connected would be preferred. While the directional valve 2 is shown as a solonoid operated spring centered valve, there are a variety of valve operators available such as, but not restricted to, pneumatic, hydrualic, cam, and manual.

Also, the first valve means 4 is shown as a solenoid operated valve 4. Similar valves with other types of actuation, such as, but not restricted to, cam, pneumatic, hydraulic, or manual would also serve the same purpose.

Also, the term fluid is intended to cover any fluid suitable for serving its intended purpose in the preferred embodiment of the invention described. There are many different types of fluids currently used or being developed for hydraulic drives, such as, but not restricted to, hydraulic oils, engine oils, synthetic oils, vegetable base oils, even water with and without additives.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A hydraulic drive with regeneration circuit comprising:
   a) a pump;
   b) at least one hydraulic actuator;
   c) a first valve means; and
   d) a rotary flow divider;
   wherein said first valve means comprises a first position and a second position;
   wherein when said first valve means is in said first position, said rotary flow divider is isolated from fluid flowing from said pump; and
   wherein when said first valve means is in said second position, fluid flow from the at least one hydraulic actuator flows through said first valve means and through the rotary flow divider, resulting in a portion of the fluid flow from the at least one hydraulic actuator through said rotary flow divider to be returned to a reservoir and another portion of the fluid flow from the at least one hydraulic actuator through the rotary flow divider to be compbined with fluid flow from said pump into said at least one hydraulic actuator.

2. The hydraulic drive with regeneration circuit of claim 1 further comprising a directional valve enabling directional control of the at least one hydraulic actuator.

3. The hydraulic drive with regeneration circuit of claim 1 further comprising a directional valve enabling directional control of said at least one hydraulic actuator wherein fluid flow from said pump is directed through a first section of said rotary flow divider through said first valve means through said at least one hydraulic actuator while a second section of said rotary flow divider acts as a pump, drawing exhaust fluid flow from said at least one hydraulic actuator which is combined with the fluid flow from the first section of the rotary flow divider, whereupon the combined fluid flow of the first and second sections of the rotary flow divider flows through said first valve means through the at least one hydraulic actuator.

4. The hydraulic drive with regeneration circuit of claim 1 further comprising an anti-cavitation valve acting in conjunction with, and enabling fluid flow to, the second section of said rotary flow divider.

5. The hydraulic drive with regeneration circuit of claim 1 further comprising an accumulator acting in conjunction with, and enabling fluid flow to, the second section of the rotary flow divider.

6. The hydraulic drive with regeneration circuit of claim 1 wherein said first valve means is a solenoid operated, two position three way valve.

7. The hydraulic drive with regeneration circuit of claim 1 wherein said rotary flow divider is a gerotor rotary flow divider.

8. A hydraulic drive with regeneration circuit comprising:
   a pump taking fluid from a reservoir and providing pressurized fluid flow through a first line to at least one hydraulic actuator;
   said hydraulic actuator having an outlet line connected to a first valve means;
   said first valve means having a first position wherein fluid from said outlet bypasses a rotary flow divider;
   said first valve means having a second position wherein fluid from said outlet flows to said rotary divider;
   said rotary flow divider,returning a first portion of the fluid from said outlet to the reservoir and pressurizing a second portion of said fluid from said outlet and combining it with the fluid flow in said first line.

* * * * *